(12) United States Patent
Stephens et al.

(10) Patent No.: US 7,583,975 B2
(45) Date of Patent: Sep. 1, 2009

(54) ADAPTIVE TRANSMIT POWER CONTROL IN WIRELESS DEVICES

(75) Inventors: Adrian P. Stephens, Cambridge (GB); Chih C. Tsien, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 10/796,756

(22) Filed: Mar. 8, 2004

(65) Prior Publication Data

US 2005/0197147 A1    Sep. 8, 2005

(51) Int. Cl.
*H04Q 7/20* (2006.01)
*H04B 7/00* (2006.01)

(52) U.S. Cl. .................... 455/522; 455/69; 455/517; 455/67.11

(58) Field of Classification Search .............. 455/68, 455/69, 500, 517, 522, 523, 67.11, 435.1, 455/67.16, 126, 13.4, 115.1, 507, 115.3, 455/127.1; 370/311, 312, 328, 252
See application file for complete search history.

(56) References Cited

U.S. PATENT DOCUMENTS

| 5,805,994 | A | * | 9/1998 | Perreault et al. ........ 455/435.1 |
| 5,842,114 | A | | 11/1998 | Ozluturk et al. | |
| 6,122,265 | A | * | 9/2000 | Nakamura et al. ........ 370/332 |
| 6,141,565 | A | * | 10/2000 | Feuerstein et al. ........ 455/560 |
| 6,249,683 | B1 | * | 6/2001 | Lundby et al. ........... 455/522 |
| 6,263,205 | B1 | * | 7/2001 | Yamaura et al. .......... 455/442 |
| 6,496,531 | B1 | * | 12/2002 | Kamel et al. ............ 455/442 |
| 6,498,785 | B1 | * | 12/2002 | Derryberry et al. ....... 370/311 |
| 7,257,094 | B2 | * | 8/2007 | Shoemake ............... 370/311 |
| 2001/0011024 | A1 | * | 8/2001 | Lundby et al. ........... 455/522 |
| 2002/0082037 | A1 | * | 6/2002 | Salonaho et al. ......... 455/522 |
| 2004/0005906 | A1 | * | 1/2004 | Okumura et al. ......... 455/522 |

FOREIGN PATENT DOCUMENTS

WO    WO 02/41521    5/2002

OTHER PUBLICATIONS

PCT/US2005/007287—Jun. 24, 2005—International Search Report and Written Opinion.

* cited by examiner

*Primary Examiner*—John J Lee
(74) *Attorney, Agent, or Firm*—John F. Travis (57) ABSTRACT

In a wireless network communications device, transmit power levels may be interactively adjusted to dynamically maintain a desired level of network loading and/or data throughput within the network in a changing network environment.

27 Claims, 4 Drawing Sheets

ADAPTIVE TRANSMIT POWER CONTROL IN WIRELESS DEVICES

BACKGROUND

In a wireless local area network (WLAN), transmit power in the various devices in the network may be reduced to less than the maximum level to conserve battery power in the devices. However, changing transmit power levels may affect other aspects of the communications process. Reducing transmit power below a certain level may cause the signal at the receiver to be too weak to received correctly. Conversely, increasing power too much may cause interference problems between devices and/or adjoining systems. Either problem can reduce the effectiveness of the overall communications process by resulting in reduced data rates and/or increased retransmissions.

Conventional approaches to transmit power control may be too simplistic for a highly variable network environment when station mobility or other variable conditions can cause constant changes in the overall network environment.

BRIEF DESCRIPTION OF THE DRAWINGS

The invention may be used by referring to the following description and accompanying drawings that are used to illustrate embodiments of the invention. In the drawings.

DETAILED DESCRIPTION OF THE INVENTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in an embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing information in a form readable by a machine (e.g., a computer). For example, a machine-readable medium may include read only memory (ROM); random access memory (RAM); magnetic disk storage media; optical storage media; or flash memory devices.

Various embodiments of the invention may include dynamic adjustments in transmit power to affect a particular network parameter, based on observations of that network parameter. In one embodiment, the network parameter may be throughput for a particular device, i.e., the amount of data that is transmitted by the device over a particular time interval. In another embodiment, the network parameter may be network loading, i.e., the fraction of time the medium in the network is busy on the relevant channel.

Figure 1:
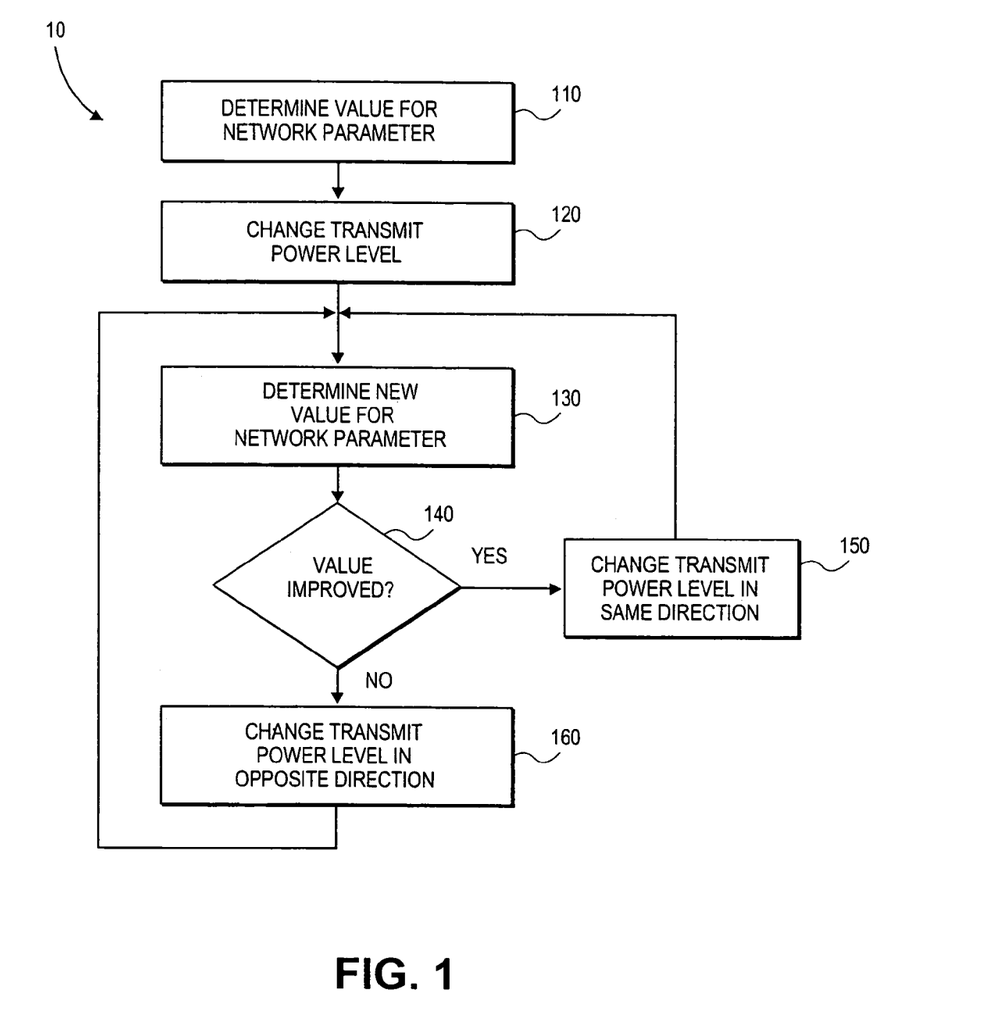
FIG. 1 shows a flow diagram of a method of adjusting transmit power in response to a network parameter, according to an embodiment of the invention.

FIG. 1 shows a flow diagram of a method of adjusting transmit power in response to a network traffic parameter, according to an embodiment of the invention. The network traffic parameter may be any of various parameters that are based on an observed volume of communications, such as: 1) data throughput for one or multiple devices, or 2) network loading as affected by multiple devices, although various embodiments of the invention may not be limited to these two examples. In flow chart 10, the process may be initialized at 110 by determining the value for a network traffic parameter for the current transmit power setting. This value may be determined by observing, measuring, calculating, or otherwise determining the particular parameter value through whatever means and information is available. In some embodiments the initial value of transmit power may be set to a default value (not shown) prior to 110, but in other embodiments the current value of transmit power, however derived, may be used.

At 120 the transmit power level may be changed by increasing or decreasing the power level. The choice to increase or decrease, the manner of making that choice, and the amount of change, may all be based on many factors not referred to in the example described in FIG. 1. At 130 a new value for the network traffic parameter, based on transmissions at this new power level, may be determined. If the value for the network traffic parameter is improved, as determined at 140, the transmit power may be changed again at 150 in the same direction as the previous change (i.e., increased if the previous change was an increase, and decreased if the previous change was a decrease). If the network traffic parameter is not improved, as determined at 140, the transmit power may be changed in the opposite direction as the previous change at 160. In either case, a new value for the network traffic parameter may be determined at 130 for this new transmit power setting, and the loop repeated. In this way, the transmit power may be repeatedly adjusted to dynamically keep the network traffic parameter within a certain range, by using the changing value of the network traffic parameter as feedback. The loop may be repeated continuously, at regular intervals, at irregular intervals, or in any feasible manner. The definition of 'improved', as used in this description, may vary depending on the type of network traffic parameter, the desired results, and/or other factors.

Figure 2:
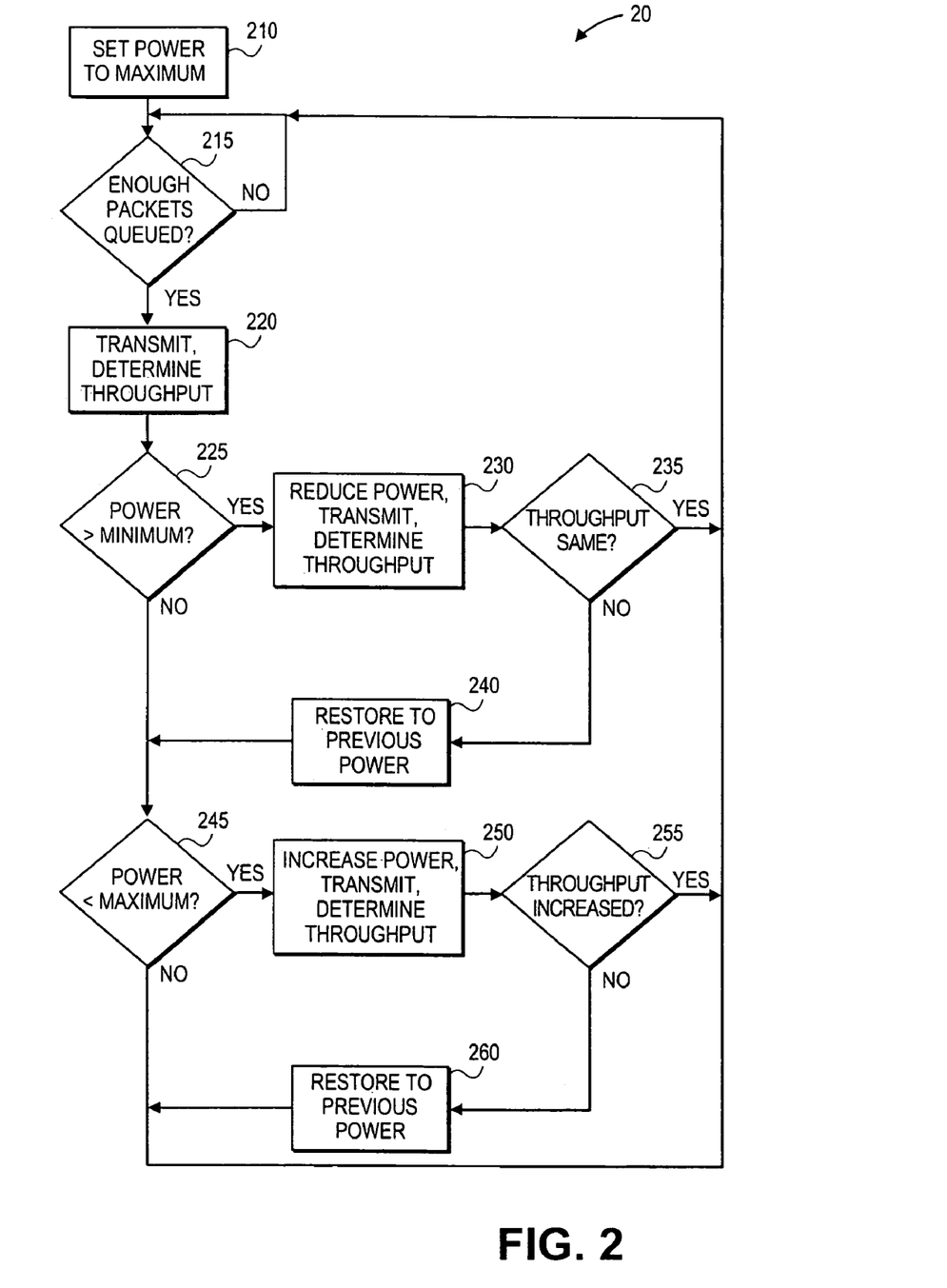
FIG. 2 shows a flow diagram of a method of adjusting transmit power based on throughout, according to an embodiment invention.

FIG. 2 shows a flow diagram of a method of adjusting transmit power based on throughput, according to an embodiment of the invention. Throughput may be determined in various ways, such as but not limited to: 1) the amount of data transmitted over a given period of time, 2) the amount of data passing through transmit queue(s) over a given period of time, 3) the amount of data validly received over a given period of time. In some embodiments a single network device may control its own transmit power and determine its own data throughput, without regard to those factors in other devices, but other embodiments may not be limited in this respect. In some embodiments, a single network device may measure the throughput of one or more devices in the network and may control the transmit power of one or more devices through the transmission of packets that indicate transmit power adjustments or new transmit power levels to be used by those devices.

In flow chart 20, the current value for transmit power may be initialized at 210 to a predetermined value, which in a particular embodiment may be the maximum value supported by the equipment, although other embodiments of the invention may not be limited in this respect. At 215, the process may wait until enough packets to make a statistically valid determination of throughput have been buffered for transmission. In some embodiments, the loop at 215 may also include waiting for a minimum period of time, even if there are enough accumulated packets. Other processes may be performed during the waiting period represented by 215, and these processes may include transmitting packets that will not be used in the throughput evaluation of flow chart 20. Once enough packets have been accumulated, the packets may be transmitted at 220 at the current value of transmit power, and a current value for throughput may be determined for those transmissions. Once a value for throughput has been determined, the current transmit power level may be compared with predetermined minimum and maximum values for power level at 225 and 245, respectively. These minimum and maximum power levels may be set based on various criteria, such as but not limited to: 1) the range of power levels that are supported by the equipment, 2) the range of power levels at which communications errors are below a certain threshold, and 3) battery reserves in the transmitting device.

If the current transmit power level setting is not above the minimum, as determined at 225, then a process of evaluating the system at a lower power level (230-235-240) may be skipped to avoid dropping the power level below that minimum. However, if the current transmit power level setting is above the minimum, as determined at 225, then the power may be reduced, more data transmitted, and a new determination of throughput made at 230, based on that newly transmitted data. At 235, if this new value of throughput is not substantially changed as compared to the throughput determined at 220 (where 'subtantially' means by more than a predefined amount), the new power level may be maintained and considered the current power level for the next cycle through flow chart 20. If the new value of throughput was substantially changed, as determined at 235, then the power level may be restored at 240 to the value associated with the throughput determination at 220, and this power level compared with the predefined maximum power level at 245.

If the power level is not below the maximum value, as determined at 245, then a process of evaluating the system at a higher power level (250-255-260) may be skipped to avoid raising the power level above that maximum. However, if the current transmit power level setting is below the maximum, as determined at 245, then the power may be increased, new data transmitted, and a new determination of throughput made at 250. At 255, if the throughput at this new power level has substantially increased, as compared to the throughput as determined at 220, then the new power level may be maintained and considered the current power level for the next cycle through flow chart 20. If the new value of throughput has not substantially increased, as determined at 255, the power level may be restored at 260 to the value associated with the throughput determination at 220, and a new cycle started through flowchart 20. The process of flow chart 20 may be repeated at regular or irregular intervals to continuously adjust the transmit power level based on feedback about the resulting effect on throughput.

Figure 3:
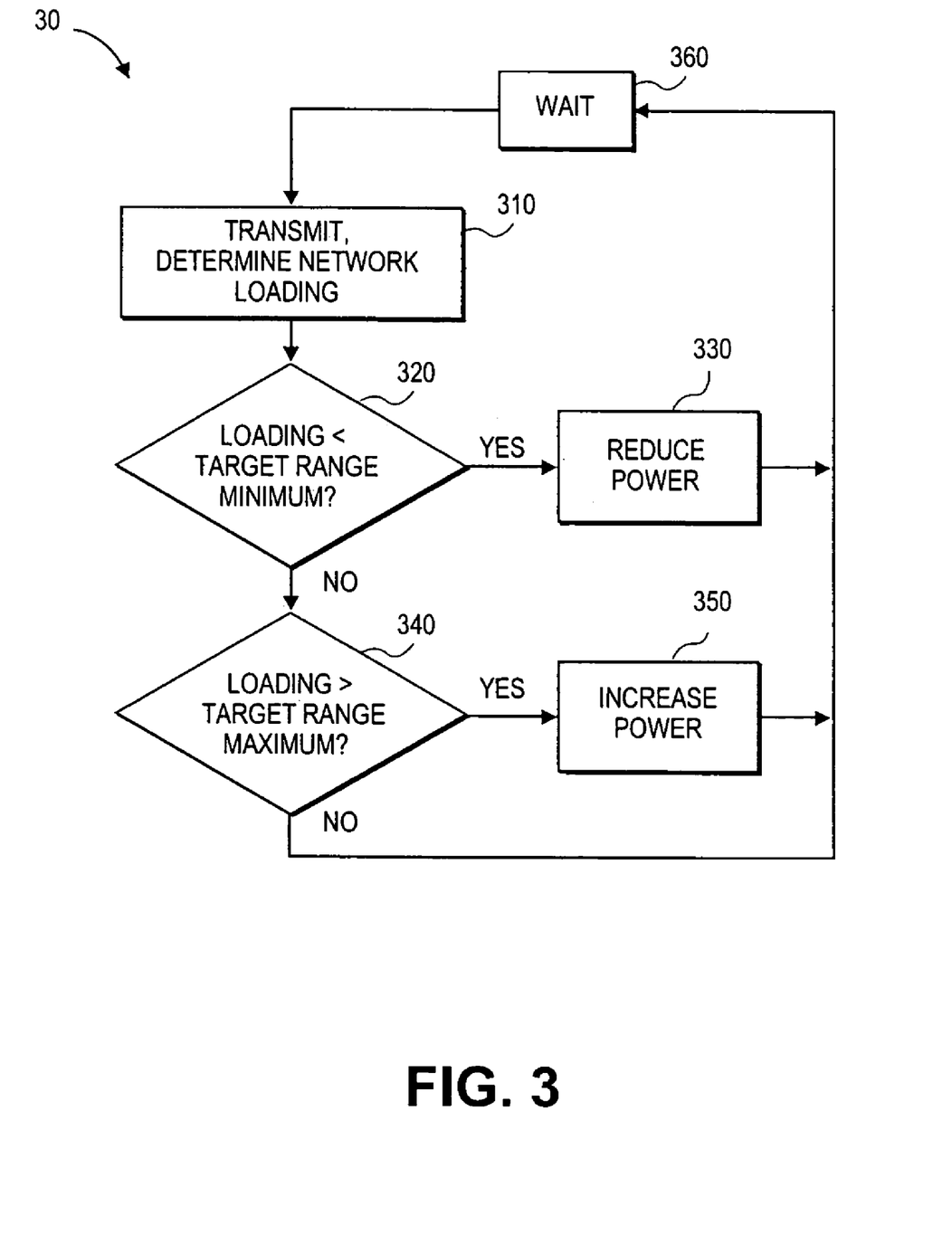
FIG. 3 shows a flow diagram of a method of adjusting transmit power based on network loading, according to an embodiment of the invention.

FIG. 3 shows a flow diagram of a method of adjusting transmit power based on network loading, according to an embodiment of the invention. Network loading may be an indication of the fraction of time that the medium is busy on the channel, where 'busy' includes both transmissions by the observing device and transmissions by other devices that are detected by the observing device. Alternately, 'busy' may be estimated by examining the amount of data buffered in transmit queues for transmission, rather than monitoring actual transmissions. In some embodiments, 'busy' may be determined by a combination of monitoring and examining transmit queues. A transmission may include things such as but not limited to transmission of data and/or transmission of a carrier wave and/or detection of energy on the channel above some threshold value. The value that indicates network loading may be determined in various ways, such as but not limited to: 1) busy time divided by total elapsed time for the observation, 2) the amount of time the medium is busy now, divided by the amount of time the medium would be busy when all stations have buffered traffic, and 3) the amount of time the medium is busy multiplied or divided by a predetermined figure. The observation of the medium may be made at a single point in the network, or may be made at multiple points in the network with the collective values merged. Network loading may be expressed as a fraction, a percentage, a numerical value, or in any other feasible manner. A network may include various components, for example in one embodiment a network may include all devices for which detectable transmissions are received on the same channel at one or more detection points. Network loading may be determined by direct measurement, by calculation, by other techniques, or by a combination of these. Calculations for determining values for network loading may be performed in a single device or may be distributed among multiple devices.

In flow chart 30, at 310 data may be transmitted and a current value for network loading determined based on those transmissions. Network loading may be determined through any feasible technique, including those previously described and other techniques not described. At 320 the current value for network loading may be compared against a predetermined minimum target value. Target values may encompass a range of values within which it is desirable to maintain the actual network loading, with minimum and maximum values at the lower and upper boundaries, respectively, of this range. In a particular embodiment, the width of the range may be approximately zero, with the minimum and maximum values being the same.

If the value of network loading is below the minimum, as determined at 320, transmit power may be reduced at 330, otherwise the value of network loading may be compared against a predetermined maximum target value at 340. If the value of network loading is above the maximum, transmit power may be increased at 350. The new current power level (whether it is the reduced value set at 330, the increased value set at 350, or the unchanged value that was determined to be within the target range at 320 and 340) may subsequently be used for transmissions during the next evaluation phase during which network loading is determined at 310 during the next cycle through flow chart 30. In some embodiments, consecutive cycles through flow chart 30 may be separated by a waiting period at 360. In some embodiments the target range for network loading may be intentionally set below the actual or theoretical maximum network loading, so that an increase above this range may still be observable and therefore correctable.

The cycles described for each of FIGS. 1-3 may be repeated at regular or irregular intervals, as often as is deemed desirable and/or feasible. By dynamically adjusting transmit power based on observed operational conditions, iterative adjustments may be made to maintain transmit power at a level that accommodates changing operational conditions. In some embodiments, the difference between an observed value and a comparison value may have to exceed a predetermined incremental threshold before the difference will be considered valid, but other embodiments of the invention may not be limited in this respect.

Figure 4:
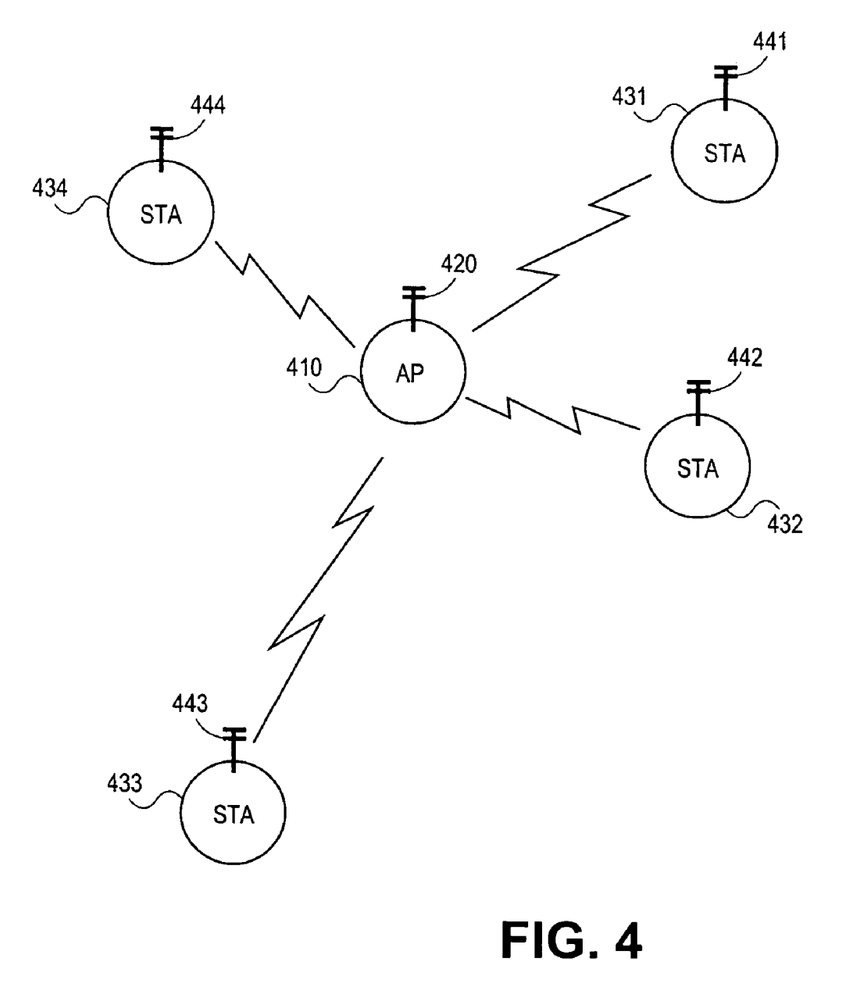
FIG. 4 shows a diagram of a portion of a network using wireless devices, according to an embodiment of the invention.

FIG. 4 shows a diagram of a portion of a network using wireless devices, according to an embodiment of the invention. In some embodiments, a wireless device may consist of an access point (AP) or a mobile station (STA), a wireless device may comprise an AP or a STA, or a wireless device may be part of a larger apparatus. In other embodiments devices other than APs and STAs may be used, although the invention is not limited in these respects. The AP 410 is shown with an antenna 420 to communicate with the STAs 431-434 through their antennas 441-444, respectively, although actual antennas may differ from the configurations shown. In some embodiments, some or all of the devices may have multiple antennas rather than the single antenna in the illustrated embodiment. In some embodiments, some or all of the antennas may be relatively omnidirectional, while in other embodiments those antennas may be relatively directional. In the illustrated embodiment, AP 410 may have established communications with STAs 431-434. The communications may use any feasible technique, such as but not limited to: frequency division multiple access (FDMA), code division multiple access (CDMA), ultra-wide band UWB), spatial division multiple access (SDMA), combinations of techniques, etc. In some embodiments, multiple groups of devices (e.g., multiple APs, each communicating with a different group of STAs) may share and/or merge network parameter values to accommodate the effects of power changes across a larger group of devices than shown in FIG. 4.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. A method, comprising
performing, within a mobile station in a wireless communications network, operations of:
transmitting data at a first transmit power level;
determining a first value for a network traffic parameter at the first transmit power level;
determining a second transmit power level different than the first power level;
transmitting data at the second transmit power level;
determining a second value for the network traffic parameter at the second transmit power level;
wherein the network traffic parameter is based on a volume of communications observed by the mobile station.

2. The method of claim 1, wherein said determining a first value comprises determining a first throughput value and said determining a second value comprises determining a second throughput value.

3. The method of claim 2, further comprising subsequently transmitting data at the second transmit power level responsive to one of:
the second transmit power level being less than the first transmit power level and the second throughput value being approximately equal to the first throughput value; and
the second transmit power level being greater than the first transmit power level and the second throughput value being greater than the first throughput value.

4. The method of claim 2, further comprising subsequently transmitting data at the first transmit power level responsive to one of:
the second transmit power level being less than the first transmit power level and the second throughput value not being approximately equal to the first throughput value; and
the second transmit power level being greater than the first transmit power level and the second throughput value not being greater than the first throughput value.

5. The method of claim 1, wherein said determining a first value comprises determining a first network loading value and said determining a second value comprises determining a second network loading value.

6. The method of claim 5 wherein said determining a second transmit power level comprises determining a second transmit power level less than the first transmit power level responsive to the first network loading value being less than a target value.

7. The method of claim 5, wherein said determining a second transmit power level comprises determining a second transmit power level greater than the first transmit power level responsive to the first network loading value being greater than a target value.

8. An article comprising
a machine-readable storage medium that provides instructions, which when executed by a computing platform, cause said computing platform to perform operations comprising:
transmitting data at a first transmit power level;
determining a first data throughput value based on transmissions at the first transmit power level;
transmitting data at a second transmit power level different than the first transmit power level;
determining a second data throughput value based on transmissions at the second transmit power level; and
setting a subsequent transmit power level at one of the first transmit power level and the second transmit power level, based on a comparison between the first and second data throughput values;
wherein all the operations of transmitting, determining, and setting are performed within a wireless mobile station.

9. The medium of claim 8, wherein:
the second transmit power level is less than the first transmit power level, and
said setting comprises setting the subsequent transmit power level to the second transmit power level responsive to determining the second data throughput value is approximately equal to the first data throughput value.

10. The medium of claim 8, wherein:
the second transmit power level is greater than the first transmit power level, and
said setting comprises setting the subsequent transmit power level to the second transmit power level responsive to determining the second data throughput value is greater than the first data throughput value.

11. The medium of claim 8, wherein the first and second transmit power levels are each less than a predefined maximum transmit power level and greater than a predefined minimum transmit power level.

12. An article comprising
a machine-readable storage medium that provides instructions, which when executed by a computing platform, cause said computing platform to perform operations comprising:
setting a first transmit power level;
transmitting data at the first transmit power level;
determining a first network loading value based on data transmitted at the first transmit power level;
comparing the network loading value with a predefined range of network loading values; and
changing the transmit power level for a subsequent transmission of data based on a result of said comparing;
wherein each operation of setting, transmitting, determining, comparing, and changing is performed within a wireless mobile station.

13. The medium of claim 12, wherein said changing comprises decreasing the transmit power level for the subsequent transmission responsive to the network loading value being less than a minimum value in the predefined range.

14. The article of claim 12, wherein said changing comprises increasing the transmit power level for the subsequent transmission responsive to the network loading value being greater than a maximum value in the predefined range.

15. The medium of claim 12, wherein said changing comprises one of:
increasing the transmit power level for the subsequent transmission responsive to the network loading value being greater than a predefined value; and
decreasing the transmit power level for the subsequent transmission responsive to the network loading value being less than the predefined value.

16. An apparatus comprising
a wireless device to:
determine a first transmit power level;
transmit data at the first transmit power level;
determine a first value for a network traffic parameter based at least in part on transmissions at the first transmit power level;
determine a second transmit power level different than the first transmit power level;
transmit data at the second transmit power level; and
determine a second value for the network traffic parameter based at least in part on transmissions using the second transmit power level;
wherein the network traffic parameter is based on an observed volume of communications;
wherein each operation of determining and transmitting is to be performed in a mobile wireless device.

17. The apparatus of claim 16, wherein:
the network traffic parameter is a data throughput parameter;
the wireless device is further to subsequently transmit data at the second transmit power level responsive to the second transmit power level being less than the first transmit power level and the second value being approximately equal to the first value; and
the wireless device is further to subsequently transmit data at the first transmit power level responsive to the second transmit power level being less than the first transmit power level and the second value not being approximately equal to the first value.

18. The apparatus of claim 17, wherein:
the wireless device is further to subsequently transmit data at the second transmit power level responsive to the second transmit power level being greater than the first transmit power level and the second value being greater than the first value; and
the wireless device is further to subsequently transmit data at the first transmit power level responsive to the second transmit power level being greater than the first transmit power level and the second value not being greater than the first value.

19. The apparatus of claim 16, wherein:
the network traffic parameter is a network loading parameter; and
the wireless device is further to set the second transmit power level less than the first transmit power level responsive to the first value being less than a first predetermined value.

20. The apparatus of claim 19, wherein the wireless device is further adapted to set the second transmit power level greater than the first transmit power level responsive to the first value being greater than a second predetermined value.

21. The apparatus of claim 20, wherein the first predetermined value is a minimum value in a predetermined range of values and the second predetermined value is a maximum in the predetermined range of values.

22. A system comprising
a mobile wireless device comprising an omnidirectional antenna, the mobile wireless device adapted to:
determine a first transmit power level;
transmit data at the first transmit power level;
determine a first value for a network traffic parameter based at least in part on transmissions at the first transmit power level;

determine a second transmit power level different than the first transmit power level;

transmit data at the second transmit power level; and determine a second value for the network traffic parameter based at least in part on transmissions using the second transmit power level;

wherein the network traffic parameter is based on an observed volume of communications.

23. The system of claim 22, wherein:

the network traffic parameter is a data throughput parameter;

the wireless device is further adapted to subsequently transmit data at the second transmit power level responsive to the second transmit power level being less than the first transmit power level and the second value being approximately equal to the first value; and the wireless device is further adapted to subsequently transmit data at the first transmit power level responsive to the second transmit power level being less than the first transmit power level and the second value not being approximately equal to the first value.

24. The system of claim 23, wherein:

the wireless device is further to subsequently transmit data at the second transmit power level responsive to the second transmit power level being greater than the first transmit power level and the second value being greater than the first value; and the wireless device is further to subsequently transmit data at the first transmit power level responsive to the second transmit power level being greater than the first transmit power level and the second value not being greater than the first value.

25. The apparatus of claim 22, wherein:

the network traffic parameter is a network loading parameter; and the wireless device is further to set the second transmit power level less than the first transmit power level responsive to the first value being less than a first predetermined value.

26. The apparatus of claim 25, wherein the wireless device is further adapted to set the second transmit power level greater than the first transmit power level responsive to the first value being greater than a second predetermined value.

27. The apparatus of claim 26, wherein the first predetermined value is a minimum value in a predetermined range of values and the second predetermined value is a maximum in the predetermined range of values.

* * * * *

UNITED STATES PATENT AND TRADEMARK OFFICE
CERTIFICATE OF CORRECTION

PATENT NO. : 7,583,975 B2 Page 1 of 1
APPLICATION NO. : 10/796756
DATED : September 1, 2009
INVENTOR(S) : Stephens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1137 days.

Signed and Sealed this

Fourteenth Day of September, 2010

David J. Kappos
*Director of the United States Patent and Trademark Office*